United States Patent [19]
Yoshida et al.

[11] Patent Number: 5,273,730
[45] Date of Patent: Dec. 28, 1993

[54] METHOD OF SYNTHESIZING DIAMOND

[75] Inventors: Katsuhito Yoshida; Kazuo Tsuji, both of Itami, Japan

[73] Assignee: Sumitomo Electric Industries, Ltd., Osaka, Japan

[21] Appl. No.: 854,757

[22] Filed: Mar. 20, 1992

Related U.S. Application Data

[63] Continuation of Ser. No. 613,441, Nov. 14, 1990, abandoned, which is a continuation of Ser. No. 318,721, Mar. 3, 1989, abandoned.

[30] Foreign Application Priority Data

Mar. 8, 1988 [JP] Japan .................................. 63-52602

[51] Int. Cl.$^5$ ............................................. C01B 31/06
[52] U.S. Cl. .............................. 423/446; 156/DIG. 68
[58] Field of Search .................... 423/446; 156/DIG.; 521/86

[56] References Cited

U.S. PATENT DOCUMENTS

| | | | |
|---|---|---|---|
| 2,947,608 | 8/1960 | Hall | 423/446 |
| 2,947,609 | 8/1960 | Strong | 23/209.1 |
| 3,297,407 | 1/1967 | Wentorf | 423/446 |
| 4,073,380 | 2/1978 | Strong et al. | 423/446 |
| 4,082,185 | 4/1978 | Strong | 423/446 |
| 4,128,625 | 12/1978 | Ishizuka | 423/446 |
| 4,340,576 | 7/1982 | Strong | 423/446 |
| 4,481,180 | 11/1984 | Bedere et al. | 423/446 |
| 4,547,257 | 10/1985 | Iizuka et al. | 156/DIG. 68 |
| 4,632,817 | 12/1986 | Yazu et al. | 156/DIG. 68 |

FOREIGN PATENT DOCUMENTS

| | | | |
|---|---|---|---|
| 41433 | 12/1981 | European Pat. Off. | 423/446 |
| 56-78410 | 6/1981 | Japan | 423/446 |
| 59-164607 | 9/1984 | Japan | 423/446 |
| 59-164700 | 9/1984 | Japan | 423/446 |
| 1541847 | 3/1979 | United Kingdom | 423/446 |

*Primary Examiner*—Robert Kunemund
*Attorney, Agent, or Firm*—Wenderoth, Lind & Ponack

[57] ABSTRACT

Synthesis of diamond by the so-called thin solvent film method is improved to obtain diamond crystals with a large grain size and good quality in an economical manner. To this end, using a reaction system comprising diamond seed crystal, a carbon source and a solvent metal, one or more masses of the solvent metal are arranged independently of each other and the diamond seed crystals are arranged in such a manner that one surface of the diamond seed crystal is contacted with each solvent metal mass.

6 Claims, 1 Drawing Sheet

METHOD OF SYNTHESIZING DIAMOND

This application is a continuation of now abandoned application Ser. No. 07/613,441 filed Nov. 14, 1990 which is a continuation of now abandoned application Ser. No. 07/318,721 filed Mar. 3, 1989.

BACKGROUND OF THE INVENTION

1. Field of the Invention

This invention relates to synthesis of diamond whereby in particular, large-sized and plate-shaped diamond can be synthesized with a low cost using an ultra-high pressure apparatus.

2. Description of the Prior Art

The synthesis of diamond single crystal at an ultra-high pressure and high temperature, well known in the art, can be classified into the following two methods.

The first method is called "temperature gradient method" which method comprises using transition metal elements such as Fe, Co, Ni, Cr, Mn, Pt, etc. or alloys thereof as a solvent metal, disposing a carbon source and seed crystal at both the ends of the solvent metal so that the carbon source and seed crystal are not in contact with each other, providing a temperature difference in the solvent metal to maintain the temperature of the seed crystal relatively lower than that of the contact surface of the carbon source and solvent metal, and allowing this assembly to stand at a high temperature and high pressure to grow epitaxial diamond on the seed crystal (U.S. Pat. Nos. 4,034,066 and 4,632,817).

The second method is called "thin solvent film method" and comprises putting a reaction system consisting of a mixture of a non-diamond carbon source powder, solvent metal powder and seed crystal, or a reaction system consisting of a laminate of a non-diamond carbon source plate and solvent metal plate under such a temperature and pressure condition that diamond is thermodynamically stable, and thereby converting the non-diamond carbon source into diamond through the thin solvent film in a short time (U.S. Pat. Nos. 2,947,608; 2,947,609; 2,947,610; and 4,128,625).

As well known in the art, the temperature gradient method of the above described prior art methods is capable of synthesizing a large grain size crystal, but on the other hand, it has the following problems:

(1) The synthesis takes a very long time, so the operation of the apparatus requires a high cost.

(2) Since it is necessary to provide a temperature gradient in a sample chamber, the available volume thereof for the synthesis is small and only a small number of crystals can be synthesized, thus resulting in an increased production cost per one crystal.

In the thin solvent film method, on the contrary, the above described problem (2) can be solved, but complete prevention of spontaneous nucleation is impossible. Therefore, even if the synthesis time is lengthened, it is difficult to synthesize a large grain size crystal and moreover, the synthesized crystal is inferior in quality, for example, contaminated with many inclusions.

SUMMARY OF THE INVENTION

It is an object of the present invention to provide a synthesis method for diamond whereby the above described disadvantages of the prior art can be overcome.

It is another object of the present invention to provide a process of synthesizing diamond with a large grain diameter and high quality in an economical manner.

It is a further object of the present invention to provide an improved diamond synthesis method by means of a thin film of the solvent metal.

These objects can be attained by a method of synthesizing diamond by the thin film of the solvent metal in a reaction system comprising diamond seed crystal, a carbon source and a solvent metal, characterized in that the diamond seed crystal is arranged in such a manner that one surface of the diamond seed crystal is contacted with a mass of the solvent metal.

BRIEF DESCRIPTION OF THE DRAWINGS

The accompanying drawings illustrate the principle and merits of the present invention.

DETAILED DESCRIPTION OF THE INVENTION

Figure 1:
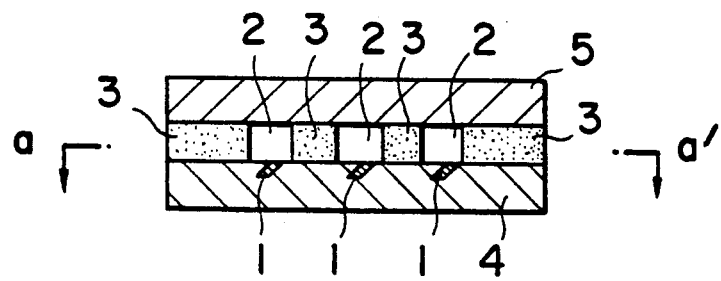
FIG. 1 is a cross-sectional view of one embodiment of the present invention for the purpose of illustrating the construction of the reaction system.

The inventors have made various efforts to solve the above described problems and consequently, have come to a conclusion that the thin solvent film method is more preferable for the synthesis of diamond crystal with a grain diameter of 1 to 2 mm. Thus, the inventors have made further studies on improvement relating to the thin solvent film method, in particular, the mechanism of spontaneous nucleation, and have found that the spontaneous nucleation takes place in a solvent metal, which is not required for the growth of diamond from a seed crystal, and an inclusions in the resulting diamond tend to enter through the boundary between the solvent metal and seed crystal disposed therein. The present invention is based on this finding, i.e., the concept that such inclusions can be reduced by carrying out the growth of diamond in such a manner that only one surface of the seed crystal is contacted with the solvent metal.

Accordingly, the present invention provides a method of synthesizing diamond by the thin solvent film method in a reaction system wherein diamond seed crystal, a carbon source and a solvent metal coexist, in which one or a plurality of solvent metal masses are arranged independently of each other and the diamond seed crystals are arranged in such a manner that one surface of each diamond seed crystal is contacted with a mass of the solvent metal.

In some preferred embodiments of the present invention, for example, (1) solvent metal masses are distributed and disposed in a carbon source, (2) diamond seed crystals are buried in a separation material not reactive with the solvent metal and carbon source and (3) through the separation material a plurality of reaction systems are stacked or laminated in each of which one or more solvent metal masses are arranged independently of each other and diamond seed crystals are arranged in such a manner that one surface of each diamond seed crystal is contacted with one of the solvent metal masses.

According to the present invention, there is provided an improved thin solvent film method. That is, in a method of growing diamond from a seed crystal comprising allowing diamond seed crystal, a carbon source and a solvent metal to coexist to form a reaction system, maintaining the reaction system under such a condition that diamond is thermodynamically stable at a temperature higher than the melting point of the solvent metal and thereby converting the carbon source such as graphite into diamond through the difference of solubility between diamond and the carbon source in the solvent at a constant temperature and pressure, i.e. difference of chemical potential, the quantity of the solvent metal required for the seed crystal is adjusted to as little as possible and the diamond seed crystal is arranged in such a manner that only one surface of the seed crystal is contacted with the solvent metal, thereby preventing the solvent metal from spontaneous nucleation, and preventing inclusions from forming in the diamond, and synthesizing large size diamond.

Figure 2:
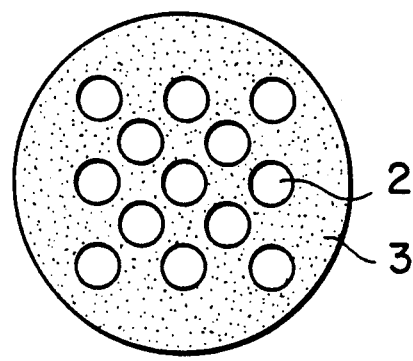
FIG. 2 is a cross-sectional view along line a—a' in FIG. 1.
Figure 3:
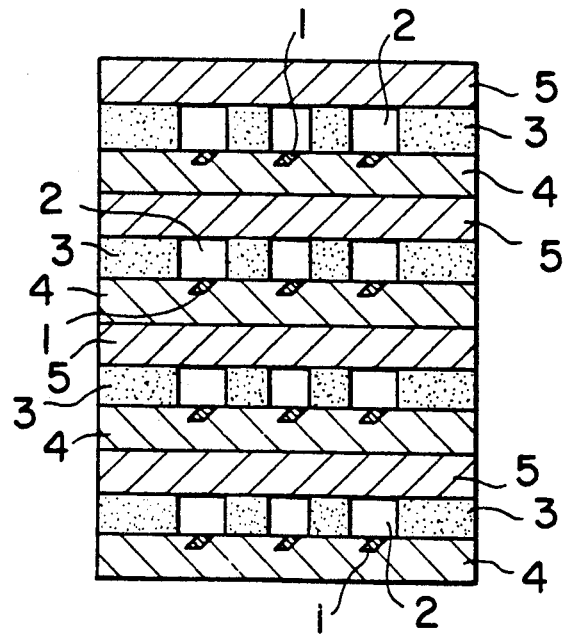
FIG. 3 is a cross-sectional view of another embodiment of the present invention for the purpose of illustrating a plurality of the reaction systems of FIG. 1, stacked or laminated.

The preferred embodiments of the present invention will now be illustrated in detail referring to the accompanying drawings. FIG. 1 is a cross-sectional view of a reaction system as one embodiment of the present invention and FIG. 2 is a cross-sectional view along the line a—a' in FIG. 1. One or more diamond seed crystals 1 are buried in the surface of a plate-shaped separation material 4 in such a manner that only one surface of the diamond seed crystal is exposed from the side surface of the separation material. The same number of solvent metal masses 2 as that of the diamond seed crystals are disposed in a carbon source 3 so as to be separated from each other by the carbon source 3 in such a manner that each of the solvent metal masses 2 is contacted with each of the diamond seed crystals 1, thereby forming a reaction system, and another separation material 5 is also put on the upper parts of the carbon source 3 and solvent metal 2. FIG. 3 is a crosssectional view of an assembly composed of a plurality of the reaction systems as shown in FIG. 1. This assembly is charged in a sample capsule of NaCl and then subjected to reaction at a high temperature and high pressure.

As the diamond seed crystal in the present invention, for example, there can be used commercially available diamond grains for diamond wheel, ordinarily having a grain size of 200 to 840 $\mu$m. As the solvent metal in the present invention, for example, there can be used Group VIII elements of the Periodic Table such as Fe, Co and Ni, Cr and Mn in the form of elements or alloys thereof. Useful examples of the alloys are Fe-40Ni-10Co, Ni-30C, etc. This solvent metal is preferably used in a minimum amount required for the growth of diamond per one seed crystal, which can for example be determined as follows: The diameter of the solvent metal mass is ideally determined based on the objective diameter of the grown diamond crystal of the present invention and is generally determined from the following range:

$$4\sqrt{d_2} > d_1 \geqq 2\sqrt{d_2}$$

wherein $d_1$ = starting diameter of the solvent metal mass and $d_2 = d_2$ = objective diameter of the grown diamond crystal. In addition, the thickness of the solvent metal mass is adjusted to the same as that of the grown crystal according to the present invention.

The seed crystal is buried in a separation material so that it will be arranged substantially at the central part of the solvent metal and separated from a carbon source by the solvent metal. As the carbon source, for example, there can be used artificial high purity graphite plates and high purity graphite powder compact.

Useful examples of the separation metal, provided as shown in FIG. 1 to FIG. 3, are NaCl, MgO, Al$_2$O$_3$, AlN, ZrO$_2$, mica and the like. This separation material is generally used in the form of a disk with a thickness of about 1 mm, prepared by pressing NaCl, MgO or Al$_2$O$_3$ powder. If the thickness is less than 1 mm, the solvent metal cannot function.

The reaction system of the present invention is composed as described above and then charged in a NaCl capsule, followed by subjecting to such high pressure and high temperature conditions as to grow diamond crystals in a similar manner to the ordinary thin solvent film method. During the same time, for example, the NaCl capsule is maintained at a temperature of 1400° C. and a pressure of 55 Kb using a pyrophyllite pressure medium in an ultra-high pressure apparatus of belt type. The reaction time mainly depends on the size of a diamond crystal to be synthesized.

In the present invention, one reaction system is generally constructed of a carbon source, a solvent metal in a required but minimized quantity, and a seed crystal, and a plurality of such reaction systems are disposed to be separated from each other by a separation material so that the reaction systems do not interfere with each other. According to the construction and arrangement of the reaction systems of the present invention, spontaneous nucleation can be prevented because (1) unnecessary solvent is removed to reduce the space required for the spontaneous nucleation and (2) the flow of carbon atoms is in a constant direction from the carbon source to the seed crystal so that localized increase in carbon concentration does not occur at portions other than the seed crystal.

When a seed crystal is disposed in a solvent metal as in the prior art method, boundary portions between the seed crystal and solvent metal cause an inclusion. In the present invention, however, only one surface of a seed crystal is utilized and accordingly, such inclusions can markedly be reduced.

Furthermore, since it is not necessary to provide a temperature distribution in a sample chamber in the method of the present invention, the volume of the sample chamber can effectively be utilized and a number of crystals can simultaneously be synthesized as shown in FIG. 3.

As illustrated above, in the synthesis method for diamond according to the present invention, diamond crystals are grown one by one in a plurality of solvent metal masses separated from each other in contact with only one surface of the diamond seed crystals. Therefore, largesized diamond single crystals with less inclusions and of higher quality and with a size of 1 to 2 mm can be obtained in large amounts by one synthesis. In this sense, the method of the present invention is very excellent from the standpoint of cost and practical use.

The following examples are given in order to illustrate the present invention in greater detail without limiting the same.

EXAMPLE 1

Diamond was synthesized in a plurality of reaction systems laminated according to the present invention as shown in FIG. 3. As a carbon source for a raw material, an artificial high purity graphite plate with a diameter of 20 mm and height of 1 mm was prepared in which 13 penetrating holes with a diameter of 1.5 mm were made. Disks each having a diameter of 1.5 mm and height of 1 mm and consisting of Fe-50Ni were prepared as a solvent metal and filled in these holes as shown in FIG. 2. Using commercially available diamond grains for diamond wheels (30/40 US mesh) as seed crystals and an $Al_2O_3$ powder compact with a diameter of 20 mm and height of 1 mm as a separation material, the seed crystals were buried in the separation material and combined with the solvent metal in such a manner that each seed crystal and solvent metal mass were contacted through one surface, thus preparing a reaction system. The thus obtained reaction systems were stacked in five stages, charged in an NaCl capsule and then subjected to reaction at a pressure of 55 Kb and a temperature of 1350° C. for 8 hours in an ultra-high pressure apparatus of belt type.

Consequently, diamond grew from all of the 65 seed crystals. Good quality diamond single crystals with less inclusion were thus obtained in a total quantity of about 400 mg, of which 41 single crystals were concentrated in a grain size of 14/16 US mesh (grain diameter of 1.2 to 1.5 mm).

EXAMPLE 2

Synthesis of diamond according to the present invention was carried out in an analogous manner to Example 1 except that the reaction time was 12 hours, thus obtaining good quality diamond single crystals with less inclusion in a total quantity of about 350 mg, of which 29 single crystals were concentrated in a grain size of 12/14 US mesh (grain diameter of 1.5 to 1.7 mm).

What is claimed is:

1. In a method of synthesizing diamond by a thin solvent film method under high pressure and high temperature in a reaction system comprising diamond seed crystals, a carbon source and a solvent metal, an improvement in which (1) a diamond seed crystal is arranged in such a manner that only one surface of the diamond seed crystal is contacted with a mass of the solvent metal, (2) through a separation material not reactive with the solvent metal and carbon source, a plurality of the reaction systems are stacked or laminated in each of which one or more solvent metal masses are arranged independently of each other in the carbon source and diamond seed crystals are correspondingly arranged in such a manner that only one surface of each diamond seed crystal is contacted with one of the solvent metal masses, (3) there is substantially no temperature gradient among the diamond seed crystals, the carbon source and the solvent metal masses, and the diamond seed crystals, the carbon source and the solvent metal masses are arranged in such a manner that the side surface of each solvent metal mass is surrounded by the carbon source, the lower part of the solvent metal mass, not in contact with the carbon source, is contacted with the diamond seed crystal, and the upper surface of the solvent metal mass, not in contact with the carbon source, is covered by the separation material, and (4) each solvent metal mass has a diameter represented by the following relationship:

$$4\sqrt{d_2} > d_1 \geq 2\sqrt{d_2}$$

wherein $d_1$ = starting diameter of the solvent metal mass and $d_2$ = objective diameter of the grown diamond crystal, wherein $d_2$ is 1 to 2 mm.

2. The method as claimed in claim 1, wherein the diamond seed crystal is buried in a separation material not reactive with the solvent metal and carbon source.

3. The method as claimed in claim 1, wherein the diamond seed crystal has a grain size of 200 to 840 μm.

4. The method as claimed in claim 1, wherein the solvent metal is selected from the group consisting of Group VIII elements the Periodic Table, chromium, manganese and alloys thereof.

5. The method as claimed in claim 2, wherein the separation material is selected from the group consisting of sodium chloride, magnesium oxide, aluminum oxide, aluminum nitride, zirconium oxide and mica.

6. The method as claimed in claim 1, wherein the carbon source is selected from the group consisting of graphite plates and graphite powder compacts.

* * * * *